(12) United States Patent
Rana et al.

(10) Patent No.: US 10,069,426 B2
(45) Date of Patent: Sep. 4, 2018

(54) ACTIVE CLAMP FLYBACK CONVERTER

(71) Applicant: FAIRCHILD KOREA SEMICONDUCTOR LTD., Bucheon (KR)

(72) Inventors: Dibyendu Rana, Milpitas, CA (US); Gwanbon Koo, Bucheon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/418,887

(22) Filed: Jan. 30, 2017

(65) Prior Publication Data

US 2017/0264206 A1 Sep. 14, 2017

Related U.S. Application Data

(60) Provisional application No. 62/307,431, filed on Mar. 12, 2016, provisional application No. 62/334,104, filed on May 10, 2016.

(51) Int. Cl.
*H02M 3/335* (2006.01)
*H02M 1/08* (2006.01)
(Continued)

(52) U.S. Cl.
CPC ....... *H02M 3/33569* (2013.01); *H02M 1/083* (2013.01); *H02M 7/06* (2013.01); *H02M 2001/0048* (2013.01)

(58) Field of Classification Search
CPC ........... Y02B 70/1491; Y02B 70/1433; H02M 3/33515; H02M 3/335; H02M 3/33523;
(Continued)

(56) References Cited

U.S. PATENT DOCUMENTS 9,136,765 B2 * 9/2015 Balakrishnan .... H02M 3/33523
2008/0315852 A1 * 12/2008 Jayaraman .......... H02M 1/4225
323/285
(Continued)

OTHER PUBLICATIONS

P.Anto Jailyn, et al "Analysis of Active Clamp Fly Back Converter", 2016, pp. 12-24, Modern Applied Science vol. 9, No. 1, Published by Canadian Center of Science and Education.
(Continued)

*Primary Examiner* — Gustavo Rosario Benitez
(74) *Attorney, Agent, or Firm* — AMPACC Law Group, PLLC

(57) ABSTRACT

An active clamp flyback converter includes a low-side switch that serves as a power switch and a high-side switch that serves as a clamp switch. The high-side switch is operated in one of two active clamp switching modes, which is selected based on load condition. In a complementary active clamp mode, the switching frequency of the low-side switch is decreased as the load increases. In a modified active clamp mode, the high-side switch is turned on in a same switching cycle first by zero voltage switching (ZVS) and second by quasi-resonant switching (QRS), with a QRS blanking time being increased as the load decreases. A ZVS delay time and dead time between switching are adaptively set based on a duty cycle of the low-side switch. The output voltage of the active clamp flyback converter is sensed from an auxiliary voltage of an auxiliary winding of the transformer.

17 Claims, 16 Drawing Sheets

(51) Int. Cl.
*H02M 7/06* (2006.01)
*H02M 1/00* (2006.01)

(58) Field of Classification Search
CPC ......... H02M 3/33569; H02M 3/33507; H02M 3/33576; H02M 3/33592; H02M 1/32; H02M 1/42; H02M 2001/0058; H02M 2001/342; H02M 1/083; H02M 7/06; H02M 2001/0048
See application file for complete search history.

(56) References Cited

U.S. PATENT DOCUMENTS

| | | | | |
|---|---|---|---|---|
| 2010/0067259 | A1* | 3/2010 | Liu | H02M 3/33569 363/21.01 |
| 2014/0169041 | A1* | 6/2014 | Jen | H02M 3/33507 363/21.04 |
| 2014/0185333 | A1* | 7/2014 | Yang | H02M 3/33569 363/21.12 |
| 2014/0233275 | A1* | 8/2014 | Yang | H02M 3/33576 363/21.17 |
| 2015/0003121 | A1* | 1/2015 | Yang | H02M 3/33523 363/21.17 |
| 2015/0016153 | A1* | 1/2015 | Orr | H02M 3/33538 363/21.04 |
| 2015/0357904 | A1* | 12/2015 | Odell | H03K 17/284 363/21.13 |
| 2016/0020701 | A1* | 1/2016 | Jitaru | H02M 3/33576 363/16 |
| 2017/0179832 | A1* | 6/2017 | Hwang | H02M 3/33569 |

OTHER PUBLICATIONS

R. Watson, et al "Utilization of an Active-Clamp Circuit to Achieve Soft Switching in Flyback Converters", 1994 IEEE, pp. 909-916, The Bradley Dept. of Electrical Engineering, Virginia Polytechnic Institute and State University.

* cited by examiner

ACTIVE CLAMP FLYBACK CONVERTER

CROSS-REFERENCE TO RELATED APPLICATIONS

This application claims the benefit of U.S. Provisional Application No. 62/307,431, filed on Mar. 12, 2016 and U.S. Provisional Application No. 62/334,104, filed on May 10, 2016, which are incorporated herein by reference in their entirety.

BACKGROUND OF THE INVENTION

1. Field of the Invention

The present invention relates generally to electrical circuits, and more particularly but not exclusively to active clamp flyback converters.

2. Description of the Background Art

Flyback converters are widely employed in switched mode power supplies, including those for travel power adapters, chargers, computers, and other applications. Generally speaking, in a flyback converter, a power switch is closed to allow the primary winding of the transformer to receive an input voltage. Closing the power switch increases the primary current and magnetic flux, stores energy in the transformer, and induces current on the secondary winding of the transformer. The induced current on the secondary winding has a polarity that places a diode rectifier in reverse bias to block charging of an output capacitor. When the power switch is opened, the primary current and magnetic flux drop, and the resulting induced current on the secondary winding changes polarity to thereby forward bias the diode rectifier and allow charging of the output capacitor to generate a DC output voltage. A load is connected to receive the output voltage.

A flyback converter may incorporate a clamp to reduce voltage and current stress on its switching components. An active clamp flyback converter is a flyback converter that has an active clamp. In contrast to a passive clamp, an active clamp has a clamp switch (also referred to herein as "high-side switch") that is switched to reduce stress on the power switch (also referred to herein as a "low-side switch").

SUMMARY

In one embodiment, an active clamp flyback converter includes a low-side switch that serves as a power switch and a high-side switch that serves as a clamp switch. The high-side switch can be operated in one of at least two active clamp switching modes, which is selected based on load condition. In a complementary active clamp mode, the high-side switch is complementary turned on with the low-side switch, and the switching frequency of the low-side switch is decreased as the load increases and vice-versa. In a modified active clamp mode, the high-side switch is turned on twice in a same switching cycle, first by zero voltage switching (ZVS) and second by quasi-resonant switching (QRS), and a QRS blanking time is increased as the load decreases and vice versa. A ZVS delay time and a dead time between switching are adaptively set based on a duty cycle of the low-side switch. The output voltage of the active clamp flyback converter is sensed from an auxiliary voltage of an auxiliary winding of the transformer.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Generally speaking, the efficiency of an active clamp flyback converter is inherently limited by high root mean square (RMS) current in the clamp switch and the transformer. In embodiments of the present invention, RMS current may be reduced by changing the active clamp switching mode and/or reducing negative current by varying the converter switching frequency based on load conditions.

The active clamp switching mode, i.e., the switching algorithm of the clamp switch, may be changed from a first mode of operation to a second mode operation, and vice versa, based on load conditions. The load condition may be detected from an output voltage feedback signal or from a signal that is derived from the integral of the drain-to-source current of the power switch, for example. The attenuation of the output voltage feedback signal may be changed depending on the active clamp switching mode.

Figure 1:
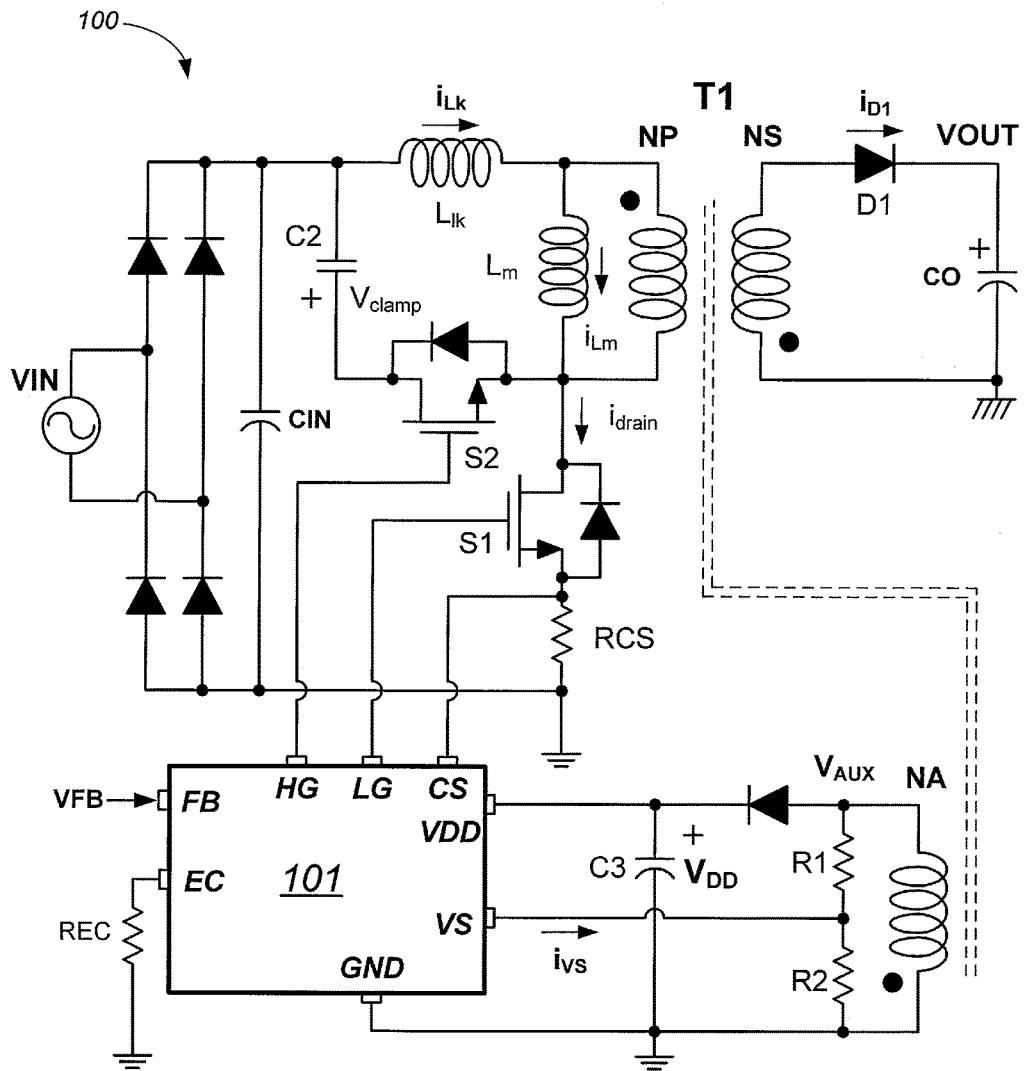
FIG. 1 shows an active clamp flyback converter in accordance with an embodiment of the present invention.

FIG. 1 shows an active clamp flyback converter 100 in accordance with an embodiment of the present invention. In the example of FIG. 1, an AC source provides an input voltage VIN that is rectified by a full-bridge rectifier, and an input capacitor CIN receives the rectified input voltage. A transformer T1 has a primary winding NP, a secondary winding NS, and an auxiliary winding NA. For analysis purposes, FIG. 1 shows the magnetizing inductance (FIG. 1, magnetizing inductance $L_m$), the magnetizing current (FIG. 1, magnetizing current $I_{Lm}$), the leakage inductance (FIG. 1, leakage inductance $L_{lk}$), and the leakage current (FIG. 1, leakage current $i_{Lk}$) seen by the transformer T1.

In the example of FIG. 1, the converter 100 has a low-side switch S1 that serves as the power switch. In one embodiment the low-side switch S1 comprises a metal oxide semiconductor field effect transistor (MOSFET) with a drain that is connected to a first end of the primary winding NP and a source that is connected to a first end of a current sense resistor RCS. The second end of the current sense resistor RCS is connected to ground. On the secondary side, the converter 100 includes a diode rectifier D1 with an anode that is connected to a first end of the secondary winding NS and a cathode that is connected to a first end of an output capacitor CO. The second end of the output capacitor CO and the second end of the secondary winding NS are connected to ground. The DC output voltage VOUT is developed across the output capacitor CO.

In the example of FIG. 1, active clamping is provided by a clamp capacitor C2 and a high-side switch S2 that serves as the clamp switch. In one embodiment, the high-side switch S2 comprises a MOSFET with a drain that is connected to a first end of the clamp capacitor C2 and a source that is connected to the drain of the low-side switch S1 and to the first end of the primary winding NP. The second end of the clamp capacitor C2 is connected to the second end of the primary winding NP.

In the example of FIG. 1, an active clamp flyback (ACF) controller 101 controls the switching operation of the low-side switch S1 and the high-side switch S2. In one embodiment, the ACF controller 101 is implemented as an integrated circuit (IC) with a package that includes an HG pin for driving the gate of the high-side switch S2, an LG pin for driving the gate of the low-side switch S1, a CS pin for receiving a current sense signal developed on the sense resistor RCS, an EC pin for programming the active clamp switching mode change point, a VS pin for receiving a voltage sense signal, a VDD pin for receiving a supply voltage, and an FB pin for receiving an output voltage feedback signal (FIG. 1, VFB). The output voltage feedback signal is indicative of the output voltage VOUT, and may be generated using a conventional feedback circuit block (not shown). The point at which the active clamp switching mode transitions from the first mode to the second mode, and vice versa, may be programmed by selecting the resistance of the resistor REC that is connected to the EC pin. The ACF controller 101 may be implemented using a variety of analog, digital, and/or mixed circuits in accordance with the present disclosure without detracting from the merits of the present invention.

In the example of FIG. 1, the auxiliary winding NA develops an auxiliary voltage ($V_{AUX}$) across the resistor divider R1 and R2. The voltage across R2 is received by the controller 101 as the sense voltage, from which output voltage conditions may be sensed for protection circuits, etc. The voltage across the resistor divider R1 and R2 is also employed to develop the supply voltage VDD across a capacitor C3.

Figure 2:
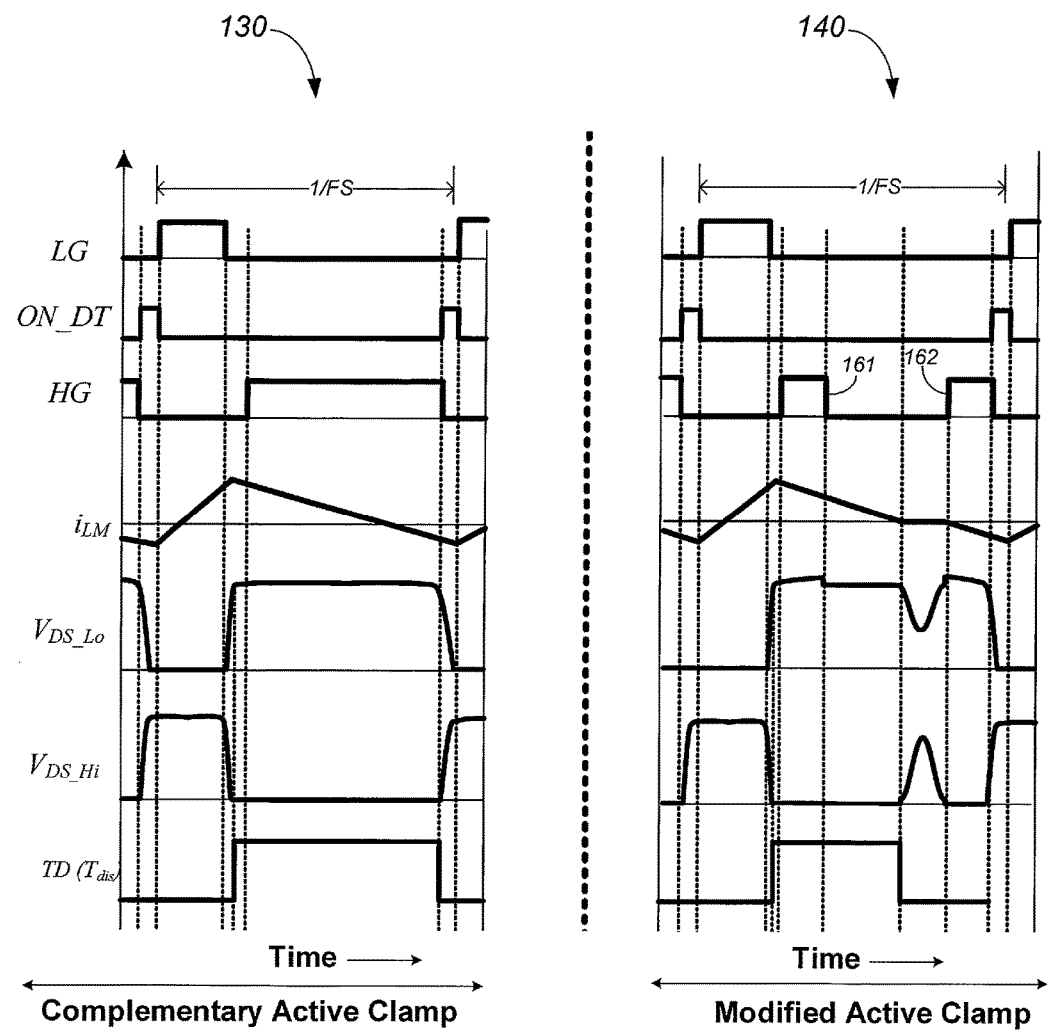
FIG. 2 shows waveforms of signals of the converter of FIG. 1 in complementary active clamp mode and in modified active clamp mode in accordance with an embodiment of the present invention.

In one embodiment, the controller 101 controls the switching operation of the low-side switch S1 and the high-side S2 in accordance with one of two active clamp switching modes, namely a complementary active clamp mode and a modified active clamp mode. FIG. 2 shows waveforms of signals of the converter 100 in complementary active clamp mode (FIG. 2, 130) and in modified active clamp mode (FIG. 2, 140) in accordance with an embodiment of the present invention. FIG. 2 shows, from top to bottom, waveforms of the low-side gate drive signal to the low-side switch S1 (FIG. 2, LG), a turn-on dead-time signal (FIG. 2, ON_DT), high-side gate drive signal to the high-side switch S2 (FIG. 2, HG), magnetizing current (FIG. 2, $i_{LM}$), drain-to-source voltage of the low-side switch S1 (FIG. 2, $V_{DS\_Lo}$), drain-to-source voltage of the high-side switch S2 (FIG. 2, $V_{DS\_Hi}$), and discharging (turn-on) time of the diode rectifier D1 (FIG. 2, TD($T_{dis}$)).

Referring to the signals in complementary active clamp mode (FIG. 2, 130), in one embodiment, the switching frequency (FIG. 2, FS) of the converter 100 is defined to be the switching frequency of the low-side switch S1. Accordingly, the low-side switch S1 turns on once per switching cycle, i.e., in one period (1/FS) of the switching frequency of the converter 100. As its name implies, in complementary active clamp mode, the high-side switch S2 is on when the low-side switch S1 is off, and the high-side switch S2 is off when the low-side switch S1 is on. The high-side switch S2 turns on once per switching cycle. When the high-side switch S2 turns off, the low-side switch S1 turns on after a dead time indicated by the turn-on dead-time signal. The magnetizing current increases when the low-side switch S1 is on, and decreases when the low-side switch S1 is off. When the low-side switch S1 is off, the current from the primary winding NP flows through the body diode of the high-side switch S2 to charge the clamp capacitor C2 (see FIG. 1) and develop the clamp voltage (FIG. 1, $V_{CLAMP}$). The high-side switch S2 turns on after a dead time after the low-side switch S1 turns off. In one embodiment, for improved efficiency, the switching frequency of the converter 100 is automatically adjusted based on the load condition in complementary active clamp mode. The switching frequency of the converter 100 increases as the load decreases, and decreases as the load increases. The converter 100 is preferably placed in complementary active clamp mode during heavy load conditions.

Referring to the signals in modified active clamp mode (FIG. 2, 140), the low-side switch S1 turns ON and OFF as in the complementary active clamp mode. The main difference being that in the modified active clamp mode, the high-side switch S2 turns ON twice per switching cycle of the converter 100. Accordingly, in one embodiment, the high-side gate drive signal to the high-side switch S2 has two pulses per switching cycle. When the low-side switch S1 is turned off, the drain-to-source voltage of the low-side switch S1 increases, with the first pulse (FIG. 2, 161) of the high-side gate drive signal being generated when the drainto-source voltage of the high-side switch S2 becomes zero (i.e., zero voltage switching (ZVS)). The second pulse (FIG. 2, 162) of the high-side gate drive signal is generated by quasi-resonant switching (QRS) after expiration of a QRS blanking time. The pulse widths of the first and second pulses of the high-side gate drive signal may be preset or adaptively set. In some embodiments, the pulse width of the second pulse of the high-side gate drive signal is adaptively set based on the duty cycle of the converter 100. In the example of FIG. 2, the second pulse of the high-side gate drive signal is generated at the peak of the drain-to-source voltage of the low-side switch S1 after expiration of the QRS blanking time. In one embodiment, for improved efficiency, the QRS blanking time is automatically adjusted based on load condition. The QRS blanking time may be increased (i.e., made longer) as the load decreases, and decreased (i.e., made shorter) as the load increases. The converter 100 is preferably placed in modified active clamp mode during medium and light load conditions.

Figure 3:
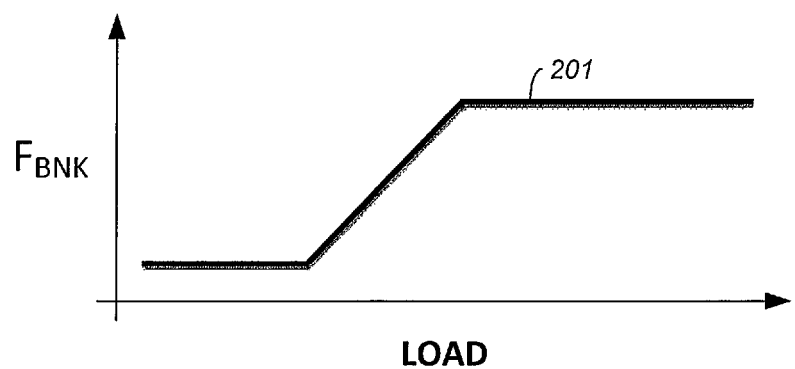
FIG. 3 shows a plot that illustrates a quasi-resonant switching (QRS) blanking frequency as a function of load condition in accordance with an embodiment of the present invention.

FIG. 3 shows a plot 201 illustrating the QRS blanking frequency $F_{BNK}$ as a function of load condition in accordance with an embodiment of the present invention. In the example of FIG. 3, the QRS blanking time, i.e., $1/F_{BNK}$, is shorter at heavy load conditions and is longer at light load conditions. As is well known, the load is heavy when the load draws a large amount of current from the converter, and the load is light when the load draws a small amount of current from the converter. The QRS blanking time is a period during which turning on of the high-side switch S2 by quasi-resonant switching is disabled. That is, the high-side switch S2 cannot be turned on by quasi-resonant switching during the QRS blanking time.

As explained, in the modified active clamp mode, the second pulse of the high-side gate drive signal is asserted by quasi-resonant switching. Generally speaking, quasi-resonant switching introduces lower conduction losses compared to complementary switching. However, as the load decreases, the percentage of switching loss increases. Accordingly, for improved efficiency, the QRS blanking time is increased (i.e., the QRS blanking frequency $F_{BNK}$ is decreased) when the load decreases as shown in FIG. 3. It is to be noted that the plot 201 is provided for general illustration of the adjustable QRS blanking time feature in modified active clamp mode. More particularly, the plot 201 does not necessarily have a flat response during heavy load conditions.

Figure 4:
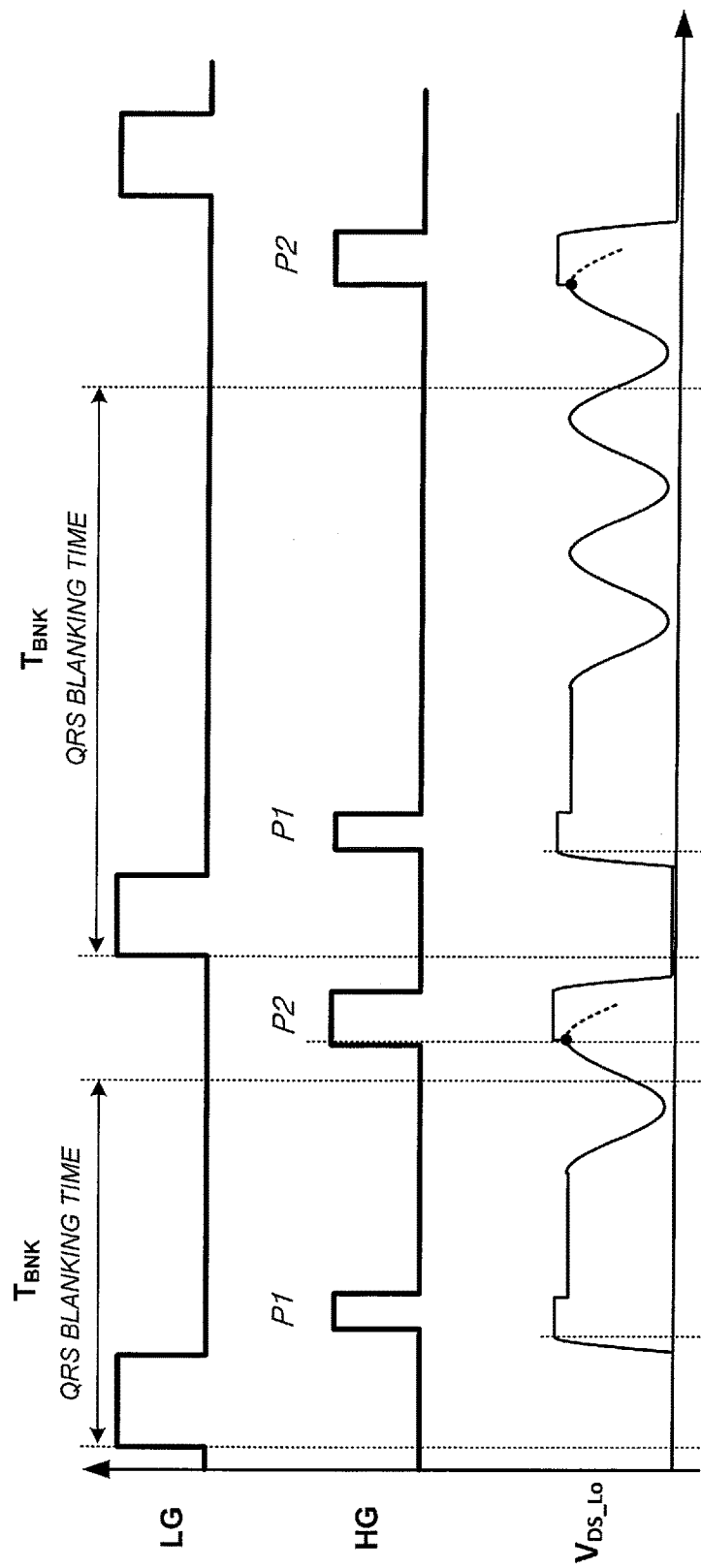
FIG. 4 shows waveforms of signals of the converter of FIG. 1 in modified active clamp mode in accordance with an embodiment of the present invention.

FIG. 4 shows waveforms of signals of the converter 100 in modified active clamp mode in accordance with an embodiment of the present invention. FIG. 4 shows details of the low-side gate drive signal to the low-side switch S1 (FIG. 4, LG), high-side gate drive signal to the high-side switch S2 (FIG. 4, HG), and the drain-to-source voltage of the low-side switch S1 (FIG. 4, $V_{DS\_Lo}$). When the low-side gate drive signal is de-asserted, the low-side switch S1 turns off, causing the drain-to-source voltage of the low-side switch S1 to increase. At the first peak of the drain-to-source voltage of the low-side switch S1, which happens at ZVS of the high-side switch S2, the first pulse P1 of the high-side gate drive signal is generated. At some point after the hi-side switch S2 turns off, the drain-to-source voltage of the low-side switch S1 starts to oscillate. The high-side switch S2 is disabled from being turned on during the QRS blanking time (FIG. 4, $T_{BNK}$). When the peak of the drain-to-source voltage of the low-side switch S1 occurs after expiration of the QRS blanking time, the second pulse P2 of the high-side gate drive signal is generated. As explained, the QRS blanking time may be adaptively adjusted based on load conditions in the modified active clamp mode.

Figure 5:
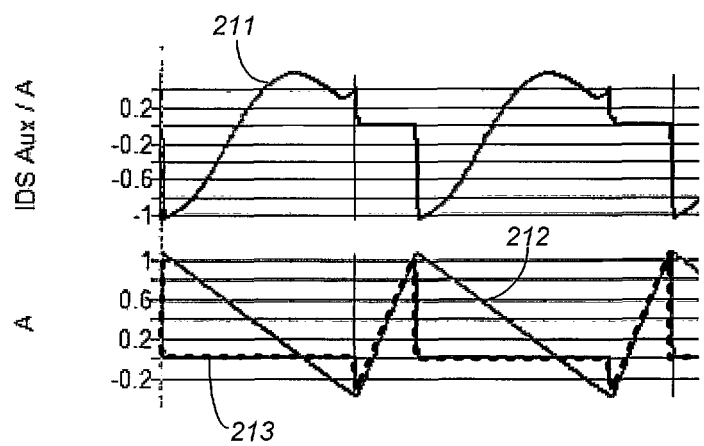
FIGS. 5-7 show results of simulations of the converter of FIG. 1 in complementary active clamp mode in accordance with an embodiment of the present invention.
Figure 6:
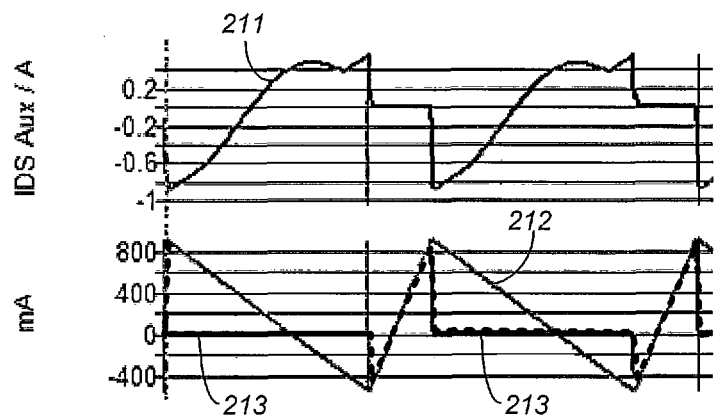
Figure 7:
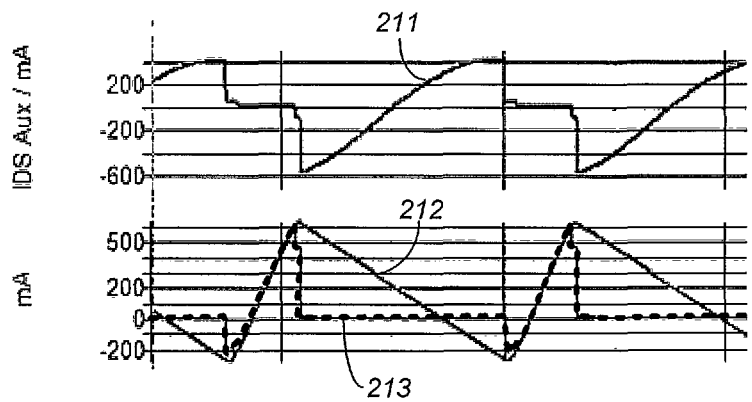
Figure 8:
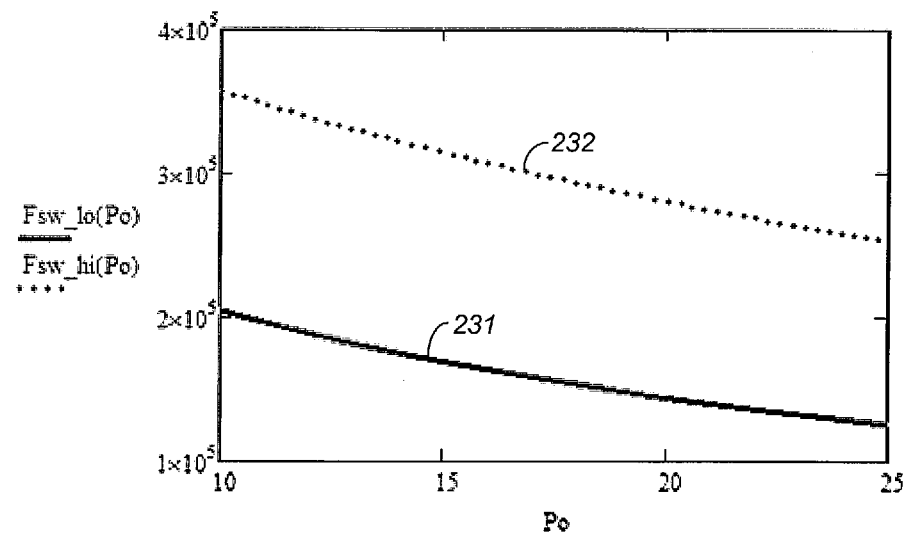
FIG. 8 shows plots of switching frequency at low line voltage input and high line voltage input as a function of power loss for the same negative current.

FIGS. 5-7 show results of simulations of the converter 100 in complementary active clamp mode in accordance with an embodiment of the present invention. The simulation results of FIGS. 5-7 assume a high-side switch S2 with a drain-to-source on resistance (Rdson) of 0.5 ohm and a primary winding NP with a 2Ω resistance. In FIGS. 5-7, the top waveform (plot 211) is for the drain-to-source current IDS of the high-side switch S2 and the bottom waveforms are for the magnetizing current (plot 212) and negative current (plot 213). FIG. 5 shows simulation results for a full load at 250 KHz switching frequency, high-side switch S2 current of 484 mA RMS, magnetizing current of 540 mA RMS, and a total power loss of 780 mW (~3% loss). FIG. 6 shows simulation results for a 50% load (i.e., half of the rated load) at 250 KHz switching frequency, high-side switch S2 current of 423 mA RMS, magnetizing current of 426 mA RMS, and a total power loss of 580 mW (~4.6% loss). FIG. 7 shows simulation results for a 50% load at 400 KHz switching frequency, high-side switch S2 current of 283 mA RMS, magnetizing current of 320 mA RMS, and a total power loss of 270 mW (~2.2% loss). The simulation results of FIGS. 5-7 indicate that RMS current may be reduced by increasing the switching frequency. The simulation results of FIGS. 5-7 may be summarized as in the plots 231 and 232 of FIG. 8. FIG. 8 shows plots of switching frequency at low line voltage input (plot 231) and switching frequency at high line voltage input (plot 232) as a function of power loss for the same negative current. As shown in FIG. 8, increasing the switching frequency for the same negative current decreases power loss.

Figure 9:
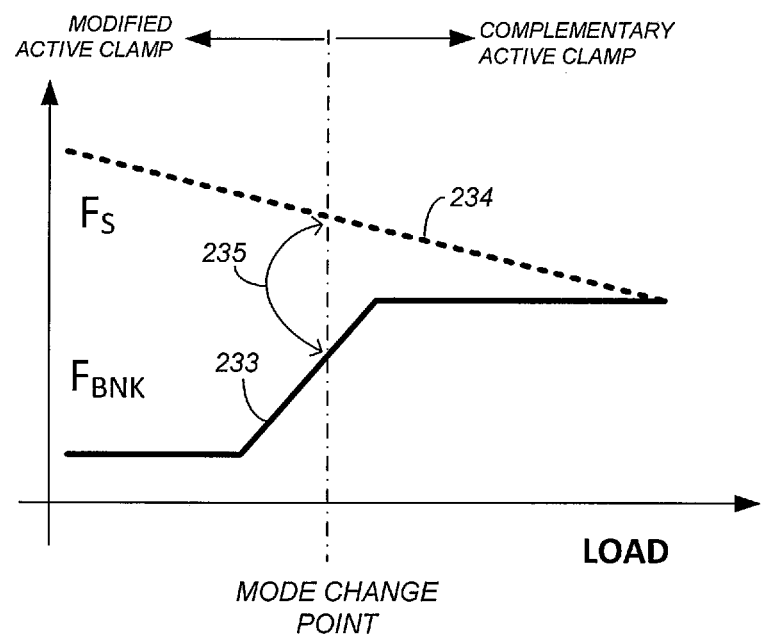
FIG. 9 graphically illustrates transition between active clamp switching modes of the converter of FIG. 1 in accordance with an embodiment of the present invention.

FIG. 9 graphically illustrates transition between active clamp switching modes of the converter 100 in accordance with an embodiment of the present invention. In the example of FIG. 9, the converter 100 performs active clamp switching in accordance with the complementary active clamp mode (plot 234) to the right of the mode change point, and performs active clamp switching in accordance with the modified active clamp mode (plot 233) to the left of the mode change point. The mode change point may be selected as a function of the rated load. In one embodiment, a user may program a particular load percentage at which the converter 100 will transition from active to modified active clamp mode and vice versa (see arrow 235). More particularly, the converter 100 transitions from complementary to modified active clamp switching when the load reduces below the mode change point, and transitions from modified to complementary active clamp mode when the load increases above the mode change point. As explained, in complementary active clamp mode, the switching frequency (FIG. 9, $F_S$) of the converter 100 is reduced as the load increases and vice versa; in modified active clamp mode, the QRS blanking time (FIG. 9, inverse of QRS blanking frequency $F_{BNK}$) is increased as the load decreases and vice versa. The load condition may be detected from an output voltage feedback signal that is indicative of the output voltage of the converter 100 or from the output power of the converter 100.

Figure 10:
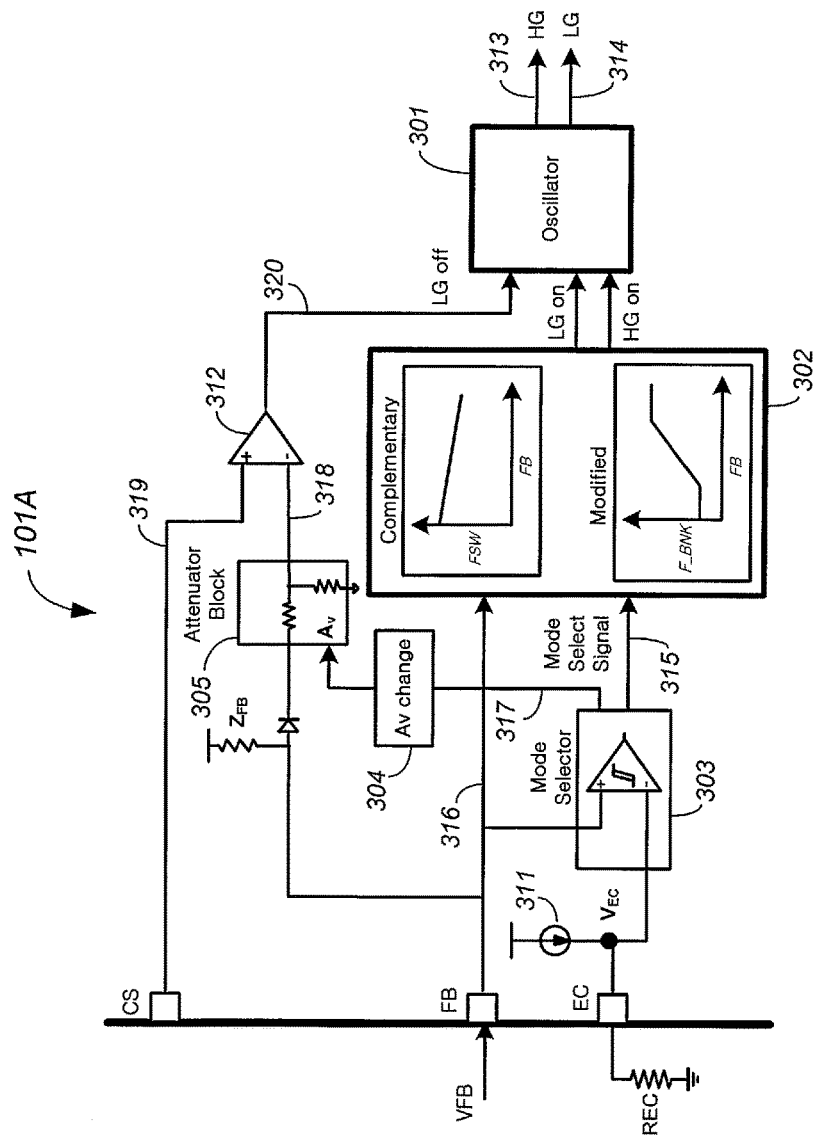
FIG. 10 shows an active clamp flyback (ACF) controller in accordance with an embodiment of the present invention.

FIG. 10 shows an ACF controller 101A in accordance with an embodiment of the present invention. The ACF controller 101A is a particular embodiment of the ACF controller 101 of FIG. 1, where the switching frequency of the converter 100 in complementary active clamp mode or the QRS blanking frequency in modified active clamp mode is adjusted based on the output voltage feedback signal (FIG. 10, VFB), which is indicative of the output voltage. Also in the ACF controller 101A, the active clamp switching mode is selected based on the output voltage feedback signal. As can be appreciated, the output voltage has information on the load condition and tends to go lower at high load conditions and tends to go higher at low load conditions.

In the example of FIG. 10, the ACF controller 101A comprises an oscillator block 301, an active clamp mode block 302, a mode selector block 303, a gain change block 304, and an attenuator block 305. As can be appreciated, the circuit blocks of the ACF controller 101A may be implemented using analog, digital, or mixed circuits without detracting from the merits of the present invention. Generally speaking, the ACF controller 101A may be implemented in accordance with the waveforms and explanations provided herein using a variety of circuits.

In the example of FIG. 10, the oscillator block 301 is configured to generate a high-side gate drive signal (FIG. 10, 313) for driving the high-side switch S2 and a low-side gate drive signal (FIG. 10, 314) for driving the low-side switch S1 in accordance with complementary active clamp node (see FIG. 2, 130) or in accordance with modified active clamp mode (see FIG. 2, 140) depending on which active clamp switching mode is currently selected. The high-side and low-side gate drive signals may be provided to the high-side switch S2 and low-side switch S1, respectively, directly or through another circuit (e.g., for additional processing).

In the example of FIG. 10, the oscillator block 301 receives an LG off signal that indicates turning off the low-side switch S1, an LG on signal that indicates turning on the low-side switch S1, and an HG on signal that indicates turning on the high-side switch S2. The oscillator block 301 asserts/de-asserts the high-side and low-side gate drive signals in accordance with the LG off, LG on, and HG on signals. It is to be noted that the high-side gate drive signal may be de-asserted when the HG on signal is de-asserted; accordingly, the high-side gate drive signal does not necessarily need to be actively turned off by a separate signal.

In the example of FIG. 10, the active clamp mode block 302 is configured to generate the LG on and HG on signals in accordance with complementary active clamp mode or modified active clamp mode, whichever is currently selected. The active clamp mode block 302 is set for complementary active clamp mode or modified active clamp mode in accordance with a received mode select signal (FIG. 10, 315) from the mode selector block 303. The active clamp mode block 302 receives the output voltage feedback signal (FIG. 10, 316), which informs on load condition, to adjust the switching frequency of the converter 100 in complementary active clamp mode or the QRS blanking time in modified active clamp mode.

When complementary active clamp mode is selected as per the mode select signal from the mode selector block 303, the active clamp mode block 302 generates the LG on signal in accordance with the load condition, as indicated by the output voltage feedback signal. More particularly, the active clamp mode block 302 asserts the LG on signal at a frequency that is decreased when the load increases and that is increased when the load decreases. The active clamp mode block 302 asserts the HG on signal after a dead time when the LG on signal is de-asserted.

When modified active clamp mode is selected as per the mode select signal from the mode selector block 303, in one embodiment, the active clamp mode block 302 asserts the HG on signal a first time during a switching cycle as per ZVS of the high-side switch S2 and a second time during the switching cycle as per QRS of the high-side switch S2 after expiration of the QRS blanking time (FIG. 4, $T_{BNK}$). As explained, the QRS blanking time is adjusted in accordance with the load condition, as indicated by the output voltage feedback signal. The active clamp mode block 302 may generate the QRS blanking time internally. The active clamp mode block 302 may lengthen the QRS blanking time when the load decreases and shorten the QRS blanking time when the load increases. The active clamp mode block 302 generates the LG on signal after a dead time at the end of the second assertion of the HG on signal in the switching cycle.

In the example of FIG. 10, a current source 311 develops a voltage on the resistor REC to allow the user to program the mode change point at which the active clamp mode block 302 changes active clamp switching modes. The mode selector block 303 compares the voltage on the EC pint to the output voltage feedback signal on the FB pin to automatically select the active clamp switching mode based on load condition (as indicated by the output voltage feedback signal), and generates the mode select signal accordingly. The mode select signal is provided to the active clamp mode block 302 (see FIG. 10, 315) and to the gain change block 304 (see FIG. 10, 317). The gain change block 304 changes the gain of the attenuator block 305 for attenuating the output voltage feedback signal depending on the active clamp switching mode. This advantageously limits output voltage overshoot caused by active clamp switching mode transition. An amplifier 312 compares the attenuated output voltage feedback signal (FIG. 10, 318) to the current sense signal on the CS pin (FIG. 10, 319) to generate the LG off signal (FIG. 10, 320) to turn off the low-side switch S1.

Figure 11:
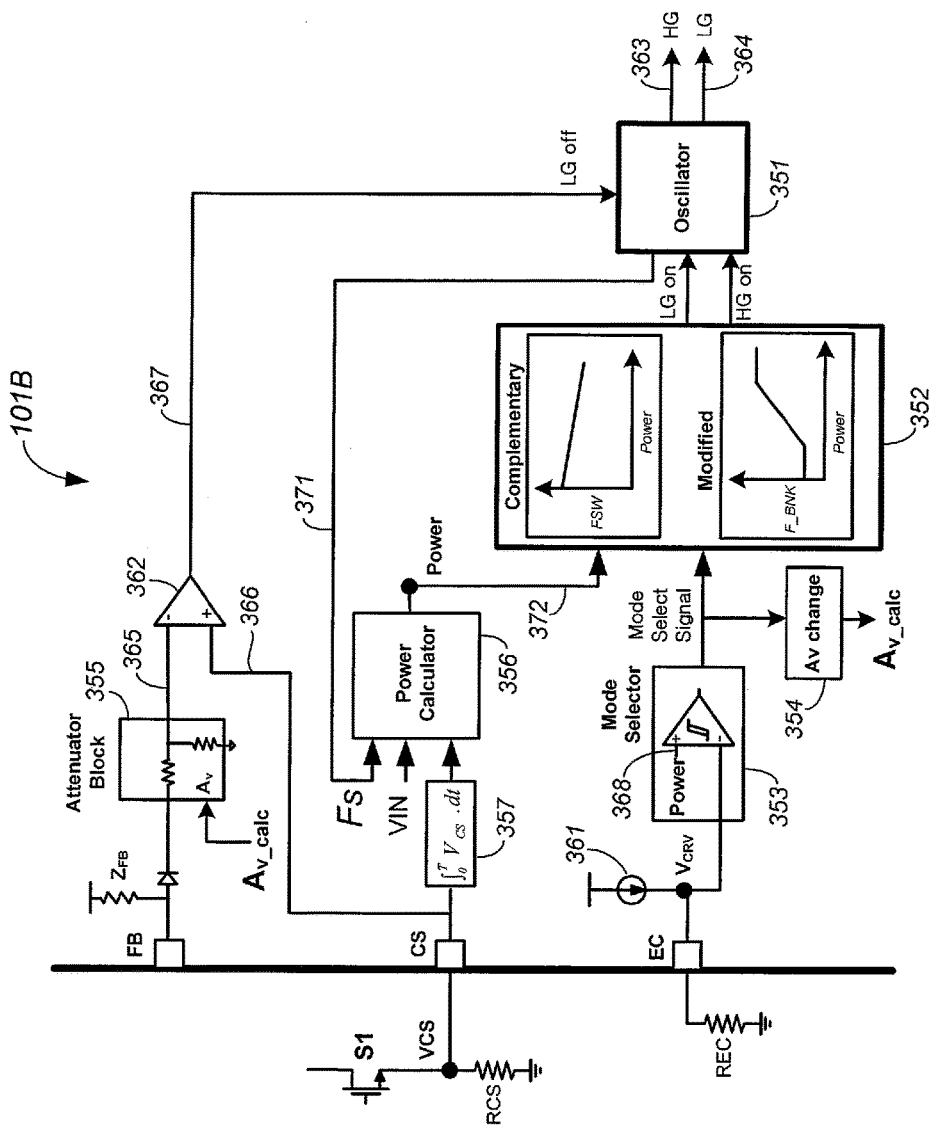
FIG. 11 shows an ACF controller in accordance with an embodiment of the present invention.

FIG. 11 shows an ACF controller 101B in accordance with an embodiment of the present invention. The ACF controller 101B is a particular embodiment of the ACF controller 101 of FIG. 1, where the switching frequency of the converter 100 in complementary active clamp mode or the QRS blanking frequency in modified active clamp mode is adjusted based on the output power of the converter 100. In the ACF controller 101B, the active clamp switching mode is selected also based on the output power.

In the example of FIG. 11, the ACF controller 101B comprises an oscillator block 351, an active clamp mode block 352, a mode selector block 353, a gain change block 354, an attenuator block 355, a power calculator block 356, and an integration block 357. As can be appreciated, the circuit blocks of the ACF controller 101B may be implemented using analog, digital, or mixed circuits without detracting from the merits of the present invention. Generally speaking, the ACF controller 101B may be implemented in accordance with the waveforms and explanations provided herein using a variety of circuits.

In the example of FIG. 11, the oscillator block 351 is configured to generate a high-side gate drive signal (FIG. 11, 363) for driving the high-side switch S2 and a low-side gate drive signal (FIG. 11, 364) for driving the low-side switch S1 in accordance with complementary active clamp node (see FIG. 2, 130) or in accordance with modified active clamp mode (see FIG. 2, 140) depending on which active clamp switching mode is currently selected. The high-side and low-side gate drive signals may be provided to the high-side switch S2 and low-side switch S1, respectively, either directly or through another circuit. In the example of FIG. 11, the oscillator block 351 generates a switching frequency signal (FIG. 11, 371) that indicates the switching frequency of the low-side switch S1, which indicates the switching frequency of the converter 100.

The oscillator block 351 receives an LG off signal that indicates turning off the low-side switch S1, an LG on signal that indicates turning on the low-side switch S1, and an HG on signal that indicates turning on the high-side switch S2.

The oscillator block 351 asserts/de-asserts the high-side and low-side gate drive signals in accordance with the LG off, LG on, and HG on signals. It is to be noted that the high-side gate drive signal may be de-asserted when the HG on signal is de-asserted; accordingly, the high-side gate drive signal does not necessarily need to be actively turned off by a separate signal.

In the example of FIG. 11, the active clamp mode block 352 is configured to generate the LG on and HG on signals in accordance with complementary active clamp mode or modified active clamp mode, whichever is currently selected. The active clamp mode block 352 is set for complementary active clamp mode or modified active clamp mode in accordance with a received mode select signal from the mode selector block 353. The active clamp mode block 352 receives an output power signal (FIG. 11, 372) indicative of the output power of the converter 100, which informs on load condition, to adjust the switching frequency of the converter 100 in complementary active clamp mode or the QRS blanking time in modified active clamp mode.

When complementary active clamp mode is selected as per the mode select signal from the mode selector block 353, the active clamp mode block 352 generates the LG on signal in accordance with the load condition, as indicated by the output power signal received from the power calculator block 356. More particularly, the active clamp mode block 352 asserts the LG on signal at a frequency that is decreased when the load increases and that is increased when the load decreases. The active clamp mode block 352 asserts the HG on signal after a dead time when the LG on signal is de-asserted.

When modified active clamp mode is selected as per the mode select signal from the mode selector block 353, in one embodiment, the active clamp mode block 352 asserts the HG on signal a first time during a switching cycle as per ZVS of the high-side switch S2 and a second time during the switching cycle as per QRS of the high-side switch S2 after expiration of the QRS blanking time (FIG. 4, $T_{BNK}$). As explained, in modified active clamp mode, the QRS blanking time is adjusted in accordance with the load condition, which in the ACF controller 101B is indicated by the output power signal. The active clamp mode block 352 may generate the QRS blanking time internally. The active clamp mode block 352 may lengthen the QRS blanking time when the load decreases and shorten the QRS blanking time when the load increases. The active clamp mode block 352 generates the LG on signal after a dead time at the end of the second assertion of the HG on signal in the switching cycle.

In the example of FIG. 11, a current source 361 develops a voltage on the resistor REC to allow the user to program the mode change point at which the active clamp mode block 352 changes active clamp switching modes. The mode selector block 353 compares the voltage on the EC pint to the output power signal (FIG. 11, 368) to automatically select the active clamp switching mode based on load condition, and generates the mode select signal accordingly. The mode selector block 353 provides the mode select signal to the active clamp mode block 352 and to the gain change block 354. The gain change block 354 changes the gain of the attenuator block 355 for attenuating the output voltage feedback signal received on the FB pin depending on the active clamp switching mode. This advantageously limits output voltage overshoot caused by active clamp switching mode transition. An amplifier 362 compares the attenuated output voltage feedback signal (FIG. 11, 365) to the current sense signal (FIG. 11, 366) on the CS pin to generate the LG off signal (FIG. 11, 367) to turn off the low-side switch S1.

In the example of FIG. 11, the CS pin receives a current sense voltage (FIG. 11, VCS) developed by the drain current of the low-side switch S1. The integration block 357 integrates the current sense voltage and provides the integrated current sense voltage to the power calculator block 356. As can be appreciated, the output power of the converter 100 may be described as, $$\text{Power} = \text{VIN} \times \int I \cdot dt \times FS \qquad \text{EQ. 1}$$

where, VIN is the input line voltage, FS is the switching frequency of the low-side switch S1 (also of the converter 100), and I is the drain current of the low-side switch S1. The power calculator block 356 receives the input line voltage VIN, switching frequency signal, and the integral of the drain current from the integration block 357 to estimate the output power and generate the corresponding output power signal provided to the active clamp mode block 352 (see FIG. 11, 372) and to the mode selector block 353 (see FIG. 11, 368).

Generally speaking, ZVS of the low-side switch S1 can be done by ensuring enough negative current during the on time of the high-side switch S2. The negative current may be controlled by a ZVS delay time; the low-side switch S1 is turned on after the ZVS delay time. In one embodiment, the ZVS delay time is the pulse width of the second pulse (FIG. 2, 162) of the high-side gate drive signal in modified active clamp mode.

The ZVS delay time may be determined from an internal inductor-capacitor (LC) delay and the duty cycle of the converter 100, which in this example is the duty cycle of the low-side switch S1. The LC delay time may be preset and the ZVS delay time may be adaptively changed with the duty cycle. The dead time between switching of the low-side switch S1 and the high-side switch S2 may be controlled to achieve ZVS operation.

The negative current may be determined from $$E_{neg} = \frac{1}{2} L_m I_{neg}^2 \geq \frac{1}{2} C_{eq} (V_{in} + nV_o)^2 \qquad \text{EQ. 2}$$

$$\Rightarrow I_{neg} \geq \sqrt{\frac{C_{eq}}{L_m}} (V_{in} + nV_o) \qquad \text{EQ. 3}$$

where, $V_{in}$ is input voltage, Vo is output voltage, n is the turns ratio of the transformer, $C_{eq}$ is equivalent capacitance, $I_{neg}$ is negative current, and $L_m$ is magnetizing inductance. It then follows that, $$\frac{L_m I_{neg}}{T_{ZVS}} = nV_o \qquad \text{EQ. 4}$$

$$\Rightarrow T_{ZVS} \geq \sqrt{L_m C_{eq}} \frac{V_{in} + nV_o}{nV_o} \qquad \text{EQ. 5}$$

$$\Rightarrow T_{ZVS} \geq \frac{\sqrt{L_m C_{eq}}}{D} \left( \because \frac{V_{in} + nV_o}{nV_o} = \frac{1}{D} \right) \qquad \text{EQ. 6}$$

$$\Rightarrow T_{ZVS} \geq \frac{T_d}{D} \qquad \text{EQ. 7}$$

As indicated by EQ. 7, the ZVS delay time ($T_{ZVS}$) may be adaptively set based on the duty cycle (D) of the low-side switch S1 and a time delay ($T_D$). The time delay $T_D$ may be preset during manufacture (by an LC delay time) or by the user, allowing the ZVS delay time to be dictated by the duty cycle of the low-side switch S1.

Figure 12:
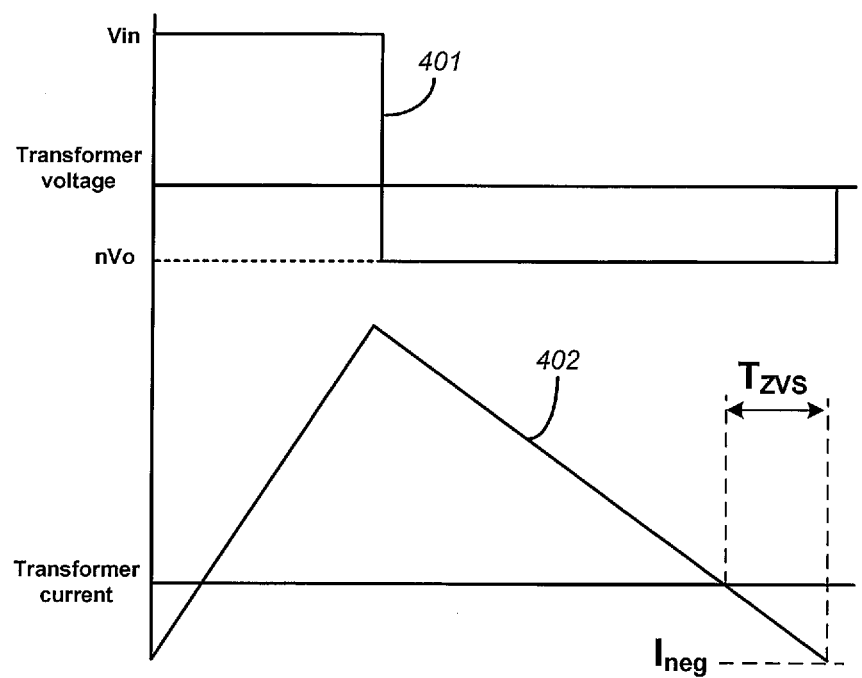
FIG. 12 shows waveforms of transformer voltage and current in accordance with an embodiment of the present invention.

FIG. 12 shows the voltage (plot 401) and current (plot 402) of the transformer T1 of the converter 100 in accordance with an embodiment of the present invention. As shown in FIG. 12, applying the input voltage VIN to the primary winding NP increases the magnetizing current. The magnetizing current (i.e., plot 402) decreases when the input voltage VIN is removed from the primary winding NP. The ZVS delay time (FIG. 12, $T_{ZVS}$) starts at zero-crossing of the magnetizing current. The ZVS delay time is adaptively set based on the duty cycle of the low-side switch S1 so that the transformer T1 builds up enough negative current (FIG. 12, $I_{neg}$) to allow ZVS of the low-side switch S1.

Figure 13:
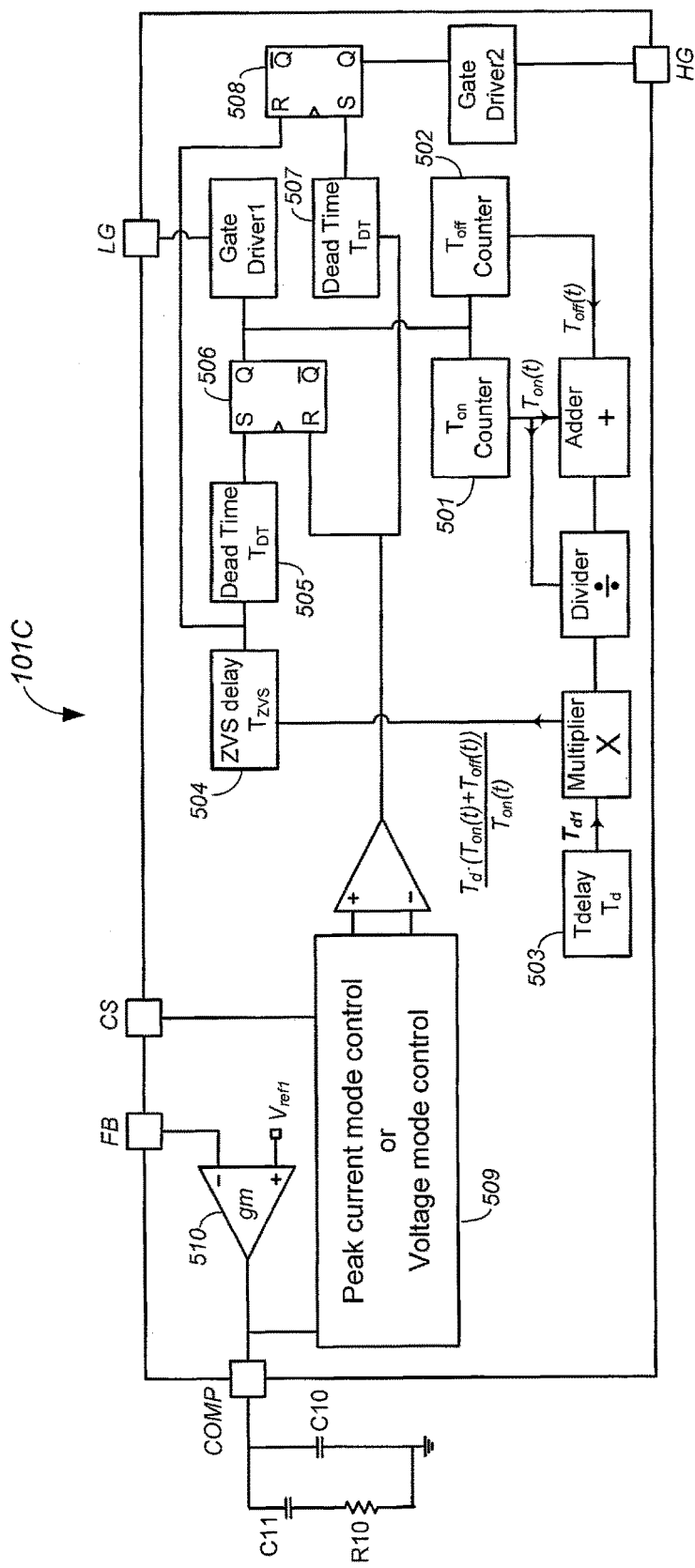
FIG. 13 shows an ACF controller in accordance with an embodiment of the present invention.

FIG. 13 shows a schematic diagram of an ACF controller 101C in accordance with an embodiment of the present invention. The ACF controller 101C is a particular implementation of the ACF controller 101 of FIG. 1. In the example of FIG. 13, the ACF controller 101C does not have selectable active clamp switching modes. In other embodiments, features of the ACF controller 101C are incorporated in the ACF controller 101A (FIG. 10) or 101B (FIG. 11) to set the pulse width of the second pulse of the high-side gate drive signal in modified active clamp mode. As can be appreciated, features of the present disclosure relating to ZVS of the low-side switch S1 may be incorporated in a variety of active clamp flyback converters without detracting from the merits of the present invention.

In the example of FIG. 13, counters are employed to measure the on-time (FIG. 13, 501) and the off-time (FIG. 13, 502) of the low-side switch S1 to detect the duty cycle of the low-side switch S1. The inverse of the duty cycle is multiplied by the time delay $T_D$ (FIG. 13, 503) to generate the ZVS delay time (FIG. 13, 504). The time delay $T_D$ may be preset by trimming during manufacture of the ACF controller 101C integrated circuit, providing an additional pin to which external components can be connected for programming, etc. In one embodiment, the ZVS delay time begins when the drain-to-source voltage of the low-side switch S1 reaches its peak. After a dead time (FIG. 13, 505) following expiration of the ZVS delay time, the low-side switch S1 is turned on by setting the flip-flop 506.

In the example of FIG. 13, the ACF controller 101C includes a COMP pin for setting the compensation of the converter 100 using external capacitors C10 and C11 and external resistor R10. The FB pin receives the output voltage feedback signal, which is compared by an error amplifier 510 to a reference voltage. The low-side switch S1 may be turned off in accordance with peak current mode control or voltage mode control (FIG. 13, 509) by resetting the flip-flop 506. When the low-side switch S1 is turned off, the high-side switch S2 is turned on after a dead time (FIG. 13, 507) by setting a flip-flop 508.

Figure 14:
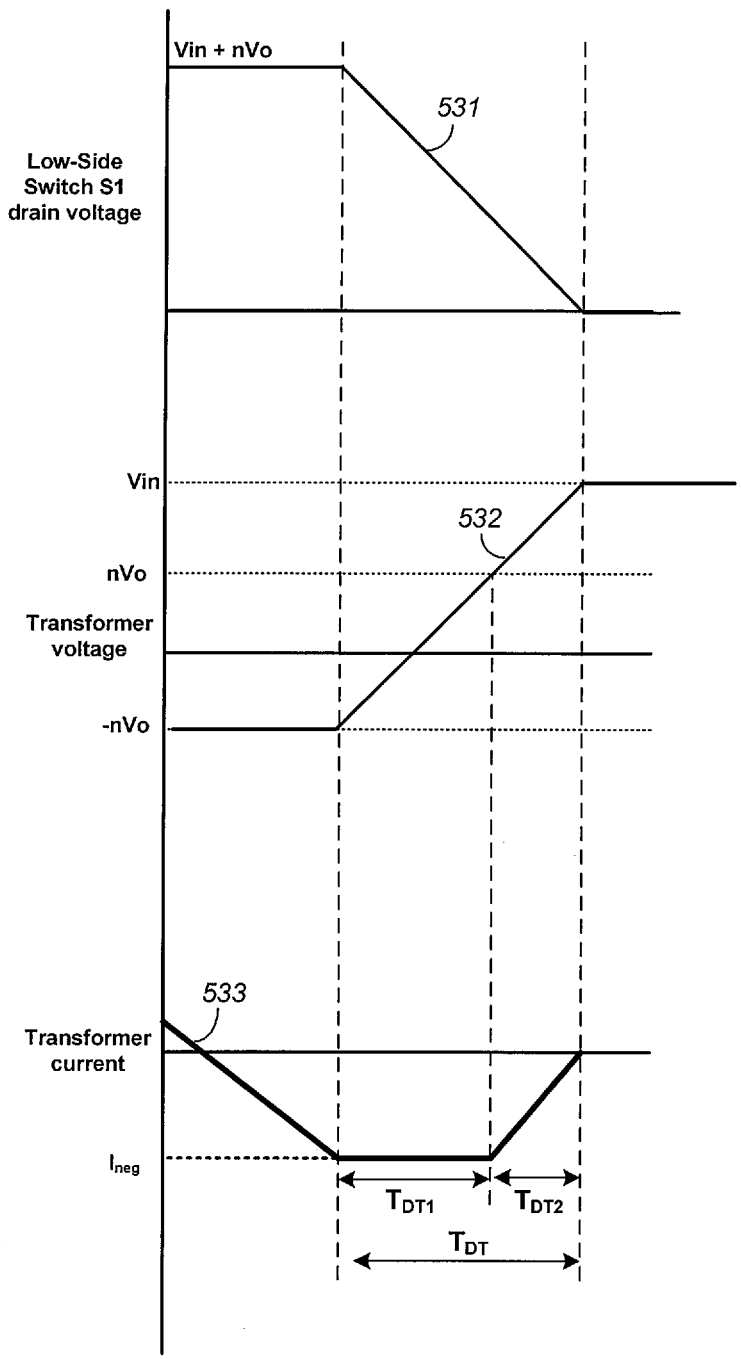
FIG. 14 shows waveforms of signals of the converter of FIG. 1 in accordance with an embodiment of the present invention.

FIG. 14 shows waveforms of signals of the converter 100 in accordance with an embodiment of the present invention. FIG. 14 shows the drain voltage of the low-side switch S1 (plot 531), the voltage of the transformer T1 (plot 532), and the current of the transformer T1 (plot 533). In the example of FIG. 14, the dead time $T_{DT}$ is the time period from the peak of the drain voltage of the low-side switch S1 to zero voltage across the drain and source (i.e., ZVS) of the low-side switch S1, the dead time $T_{DT1}$ is a time period during which the negative current of the transformer does not significantly vary, and the dead time $T_{D2}$ is a time period during which the transformer current can be considered to linearly increase. Note that the dead time $T_{DT}$ is the dead time before turning on the low-side switch S1 to meet the ZVS condition. To perform ZVS, the drain voltage of the low-side switch S1 should reach zero before the transformer current reaches zero. That is, $$I_{neg}T_{DT1} + \frac{I_{neg}T_{DT2}}{2} = C_{eq}(V_{in} + nV_o) \quad \text{EQ. 8}$$

$$\Rightarrow T_{DT1} + \frac{T_{DT2}}{2} = \sqrt{L_m C_{eq}} \quad \text{EQ. 9}$$

From the transformer voltage waveform (FIG. 14, 532), $$\frac{T_{DT1}}{T_{DT2}} = \frac{2nV_o}{V_{in} - nV_o} \quad \text{EQ. 10}$$

and solving for $T_{DT}$ $$T_{DT1} = \frac{4nV_o}{V_{in} + 3nV_o}\sqrt{L_m C_{eq}}; \quad \text{EQ. 11}$$

$$T_{DT2} = \frac{2(V_{in} - nV_o)}{V_{in} + 3nV_o}\sqrt{L_m C_{eq}}$$

$$T_{DT} = 2\sqrt{L_m C_{eq}}\left(\frac{1}{1+2D}\right) = \frac{\sqrt{L_m C_{eq}}}{0.5 + D} \quad \text{EQ. 12}$$

$$T_{DT} = \frac{\sqrt{L_m C_{eq}}}{0.5 + D} = \sqrt{L_m C_{eq}} \times \frac{2(Ton + Toff)}{3Ton + Toff} \quad \text{EQ. 13}$$

EQ. 13 gives the equation governing the proper value for the dead time $T_{DT}$, which allows for precise ZVS of the low-side switch S1. Because the magnetizing inductance ($L_m$) and equivalent capacitance ($C_{eq}$) are known or can be preset, the dead time that gives precise ZVS can be adaptively set from the on (Ton) and off (Toff) times of the low-side switch S1.

Figure 15:
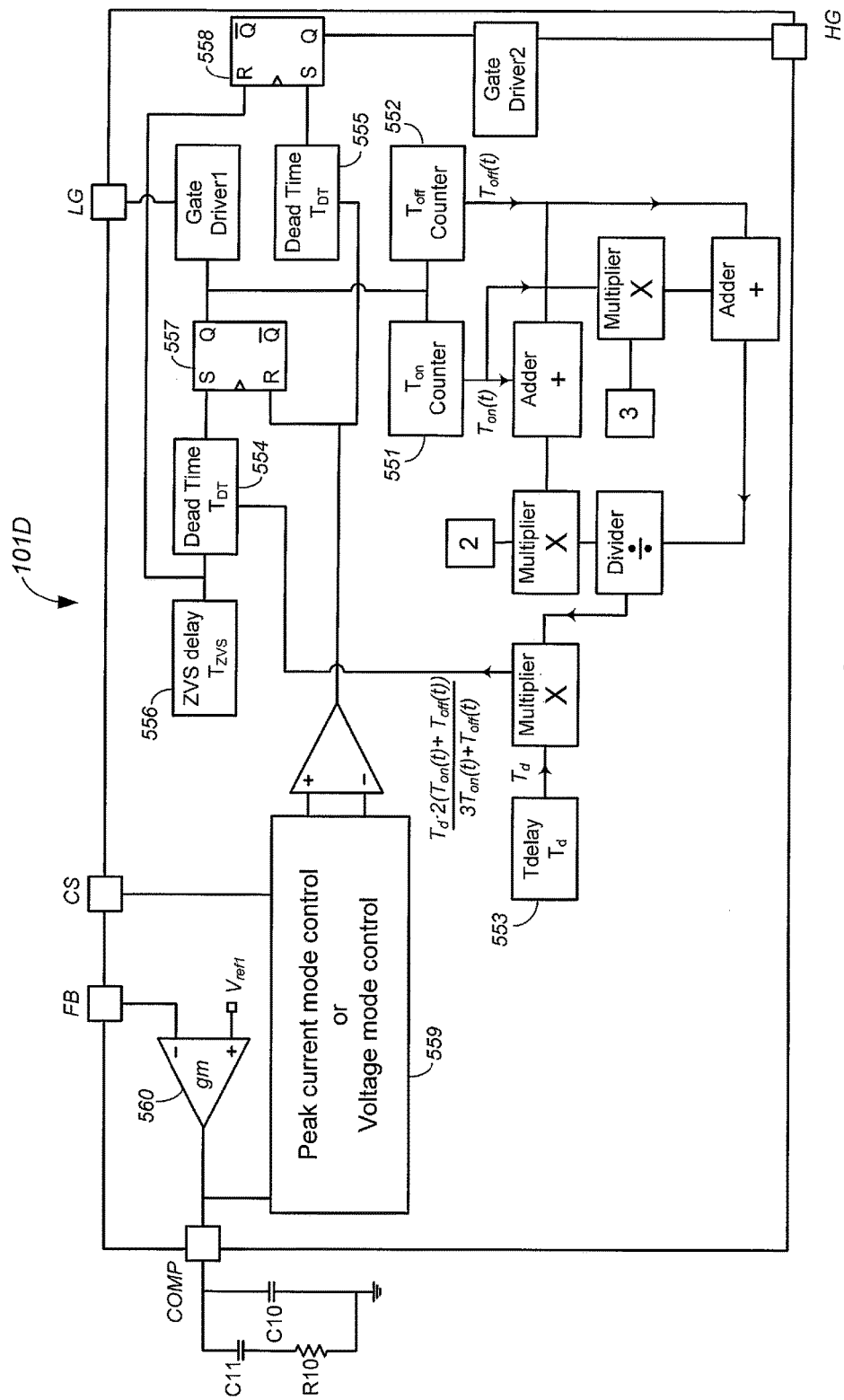
FIG. 15 shows an ACF controller in accordance with an embodiment of the present invention.

FIG. 15 shows a schematic diagram of an ACF controller 101D in accordance with an embodiment of the present invention. The ACF controller 101D is a particular implementation of the ACF controller 101 of FIG. 1. In the example of FIG. 15, the ACF controller 101D does not have selectable active clamp switching modes. In other embodiments, features of the ACF controller 101C are incorporated in the ACF controller 101A (FIG. 10), 101B (FIG. 11), or 101C (FIG. 13) to set the dead time before turning on the low-side switch S1 for precise ZVS of the low-side switch S1. As can be appreciated, features of the present disclosure relating to adaptive dead time for ZVS may be incorporated in a variety of active clamp flyback converters without detracting from the merits of the present invention.

In the example of FIG. 15, counters are employed to measure the on-time (FIG. 15, 551) and the off-time (FIG. 15, 552) of the low-side switch S1. The on- and off-times of the low-side switch S1 are processed in accordance with EQ. 13, with the constants of EQ. 13 being set by the time delay $T_D$ (FIG. 15, 553) to adaptively generate the dead time $T_{DT}$ (FIGS. 15, 554 and 555). The time delay $T_D$ may be preset by trimming during manufacture of the ACF controller 101D integrated circuit, providing an additional pin to which external components can be connected for programming, etc. In one embodiment, the ZVS delay time (FIG. 15, 556) is preset. As can be appreciated the ZVS delay time may also be adaptively set as previously explained. The ZVS delay time begins when the drain-to-source voltage of the low-side switch S1 reaches its peak. After the dead time $T_{DT}$ (FIG. 15, 554) following expiration of the ZVS delay time, the low-side switch S1 is turned on by setting the flip-flop 557.

In the example of FIG. 15, the ACF controller 101D includes a COMP pin for setting the compensation of the converter 100 using external capacitors C10 and C11 and external resistor R10. The FB pin receives the output voltage feedback signal, which is compared by an error amplifier 560 to a reference voltage. The low-side switch S1 may be turned off in accordance with peak current mode control or voltage mode control (FIG. 15, 559) by resetting the flip-flop 557. When the low-side switch S1 is turned off, the high-side switch S2 is turned on after the dead time $T_{DT}$ ((FIG. 15, 555) by setting a flip-flop 558.

Generally speaking, a primary-side ACF controller, such as the ACF controller 101, may need to be able to accurately sense output voltage information to detect output voltage overvoltage, constant current foldback, etc. In embodiments of the present invention, output voltage information may be sensed from the auxiliary winding NA of the transformer T1.

Figure 16:
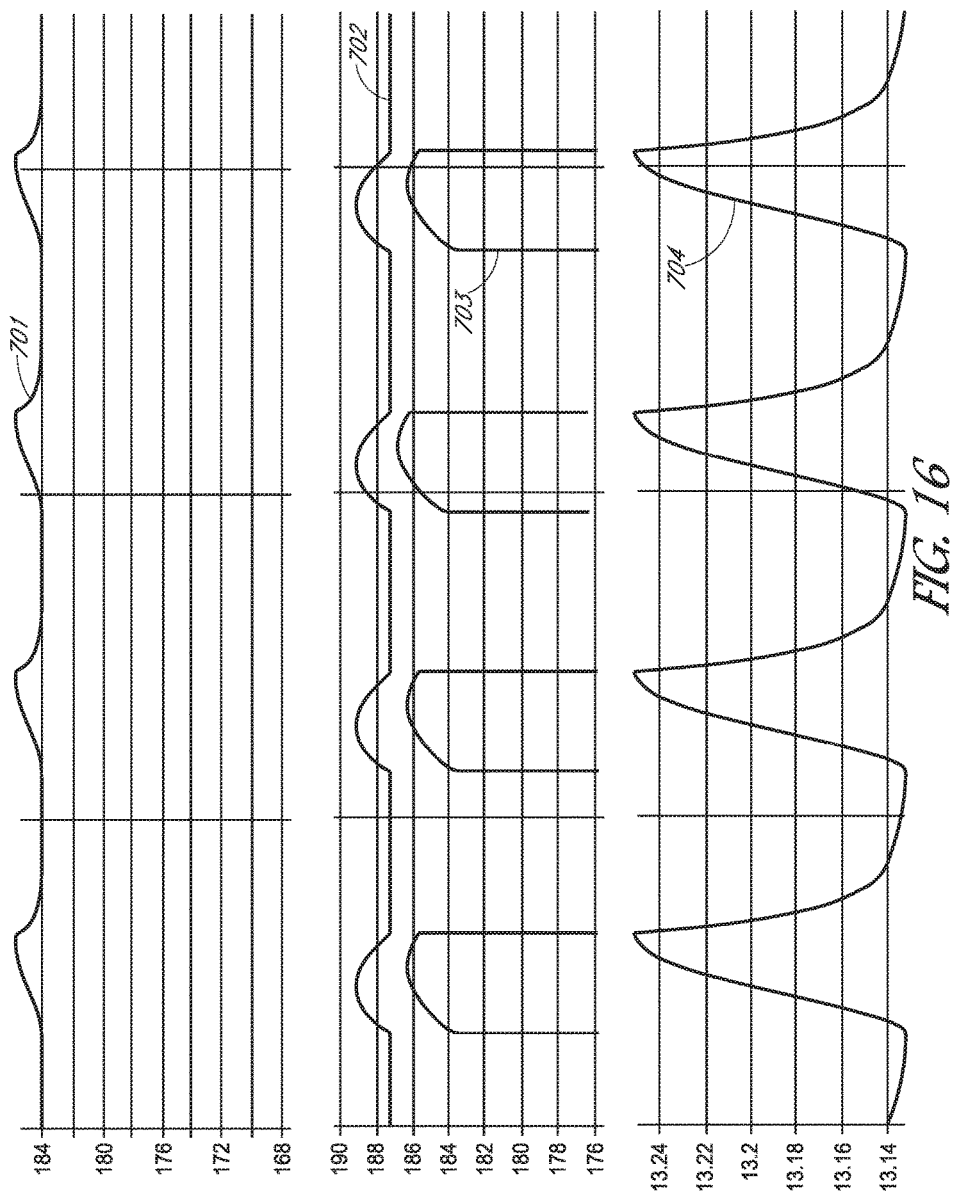
FIG. 16 shows waveforms of signals of the converter of FIG. 1 in accordance with an embodiment of the present invention.

FIG. 16 shows waveforms of signals of the converter 100 in accordance with an embodiment of the present invention. FIG. 16 shows the output voltage multiplied by the turns ratio n, i.e., nVo (FIG. 16, plot 701), the clamp voltage $V_{clamp}$ (FIG. 15, plot 702), the auxiliary voltage on the auxiliary winding NA (FIG. 15, plot 703), and the output voltage (FIG. 16, plot 704). In the example of FIG. 16, the mean of nVo is 185V, the mean of the clamp voltage is 189V, and the mean of the auxiliary voltage is 185V. Generally speaking, the auxiliary winding voltage peak value is the same as the clamp voltage and is very similar to nVo. That is, the output voltage can be accurately sensed from the peak of the auxiliary voltage, the average of the auxiliary voltage, and/or at a particular point in time with a sample and hold circuit. The sensed auxiliary voltage may be compared to a threshold (or processed some other way) to detect output voltage overvoltage, constant current foldback, and other deleterious conditions that can be detected from output voltage information.

Figure 17:
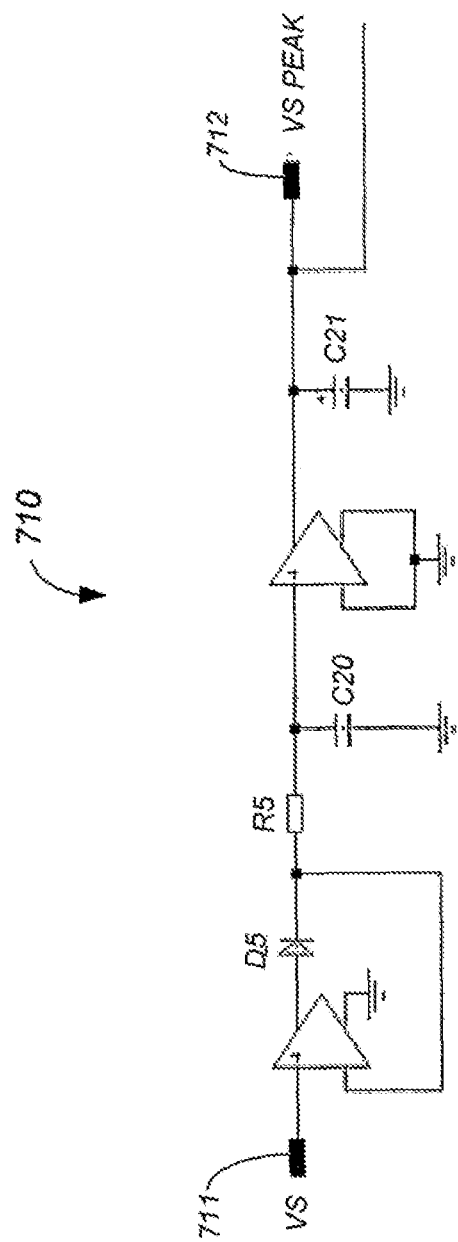
FIGS. 17-19 show schematic diagrams of output voltage sense circuits in accordance with embodiments of the present invention.

FIG. 17 shows a schematic diagram of an output voltage sense circuit 710 in accordance with an embodiment of the present invention. The output voltage sense circuit 710 may be incorporated in the ACF controller 101 and other primary-side ACF controllers for sensing the output voltage. The output voltage sense circuit 710 is configured to sense the output voltage by sensing the peak of the auxiliary voltage, i.e. the peak of the voltage on the auxiliary winding. In the example of FIG. 17, the auxiliary voltage is detected at the VS pin of ACF controller 101 (FIG. 17, 711; see also FIG. 1, VS pin of 101) as a sense voltage VS. The output voltage sense circuit 710 samples and holds the peak of the sense voltage for output at a node 712.

Figure 18:
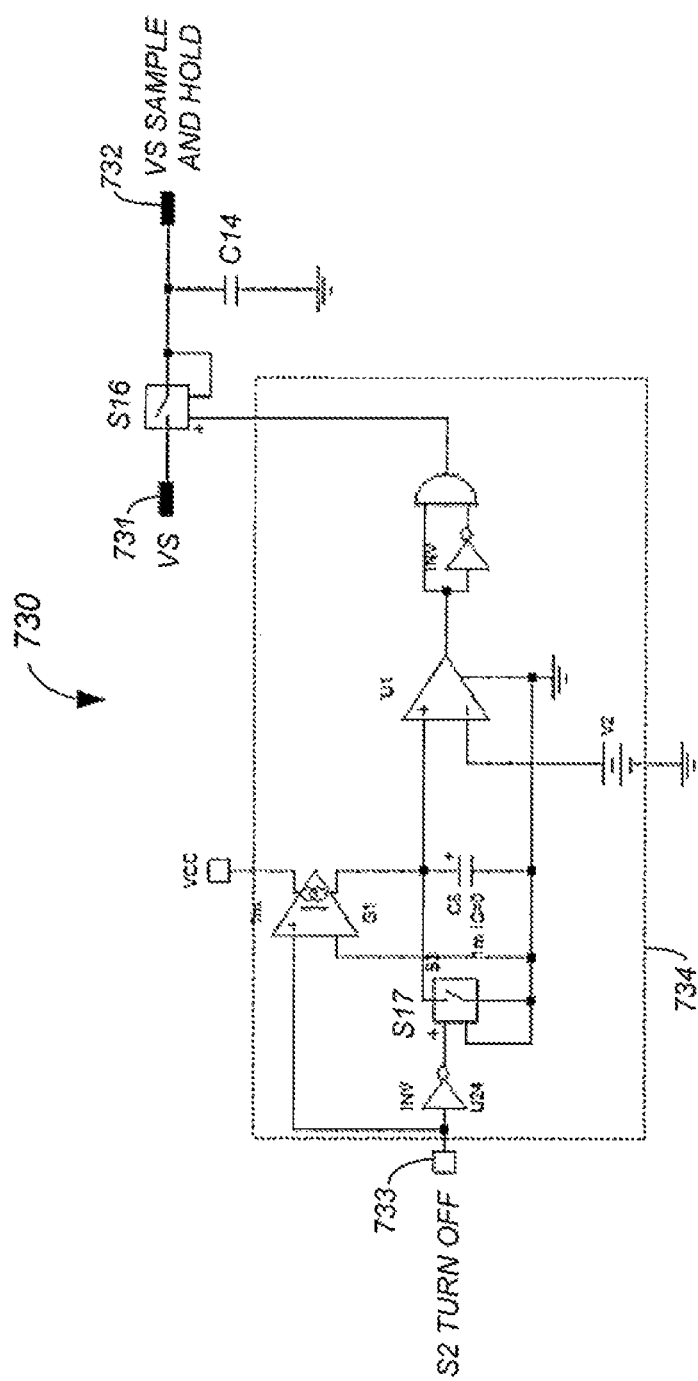

FIG. 18 shows a schematic diagram of an output voltage sense circuit 730 in accordance with an embodiment of the present invention. The output voltage sense circuit 730 may be incorporated in the ACF controller 101 and other primary-side ACF controllers for sensing the output voltage. The output voltage sense circuit 730 is configured to sense the output voltage by sampling and holding the peak of the auxiliary voltage at a particular point in time. The particular point in time is preset to be at the peak of the auxiliary voltage. In the example of FIG. 18, the auxiliary voltage is detected at the VS pin of ACF controller 101 (FIG. 18, 731; see also FIG. 1, VS pin of 101) as a sense voltage VS. The output voltage sense circuit 730 samples and holds the sense voltage a particular time, which in the example of FIG. 18 is a delay time (e.g., 1 µs) after the high-side switch S2 is turned off (FIG. 18, 733). At the end of the delay time, which is set by the time delay circuit 734, the switch S16 closes to sample and hold the sense voltage at the capacitor C14 for output at a node 732.

Figure 19:
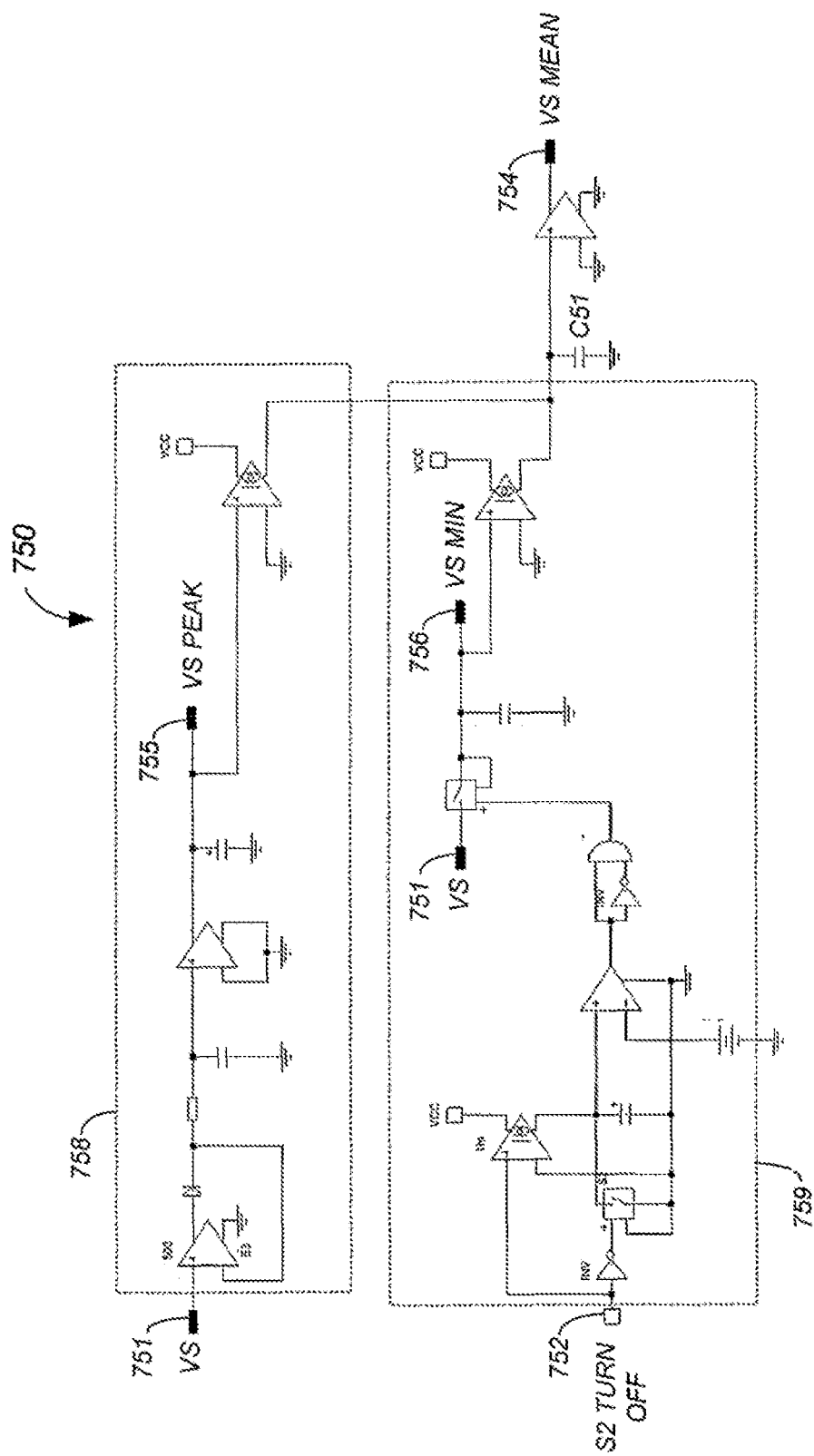

FIG. 19 shows a schematic diagram of an output voltage sense circuit 750 in accordance with an embodiment of the present invention. The output voltage sense circuit 750 may be incorporated in the ACF controller 101 and other primary-side ACF controllers for sensing the output voltage. The output voltage sense circuit 750 is configured to sense the output voltage by generating the mean of the auxiliary voltage, which as noted is very similar to the mean of nVo and the mean of the clamp voltage. In the example of FIG. 19, the auxiliary voltage is detected at the VS pin of the ACF controller 101 (FIG. 19, 751; see also FIG. 1, VS pin of 101) as a sense voltage VS.

In the example of FIG. 19, the output voltage sense circuit 750 comprises a peak detector 758 and a minimum detector 759. In one embodiment, the peak detector 758 operates in the same manner as the output voltage sense circuit 710 (FIG. 17). The peak detector 758 receives the sense voltage (FIG. 19, 751) and samples the peak of the sense voltage for output at a node 755.

In one embodiment, the minimum detector 759 operates in the same manner as the output voltage sense circuit 730 (FIG. 18), except that it samples the minimum of the sense voltage. More particularly, the minimum detector 759 samples and holds the sense voltage at a particular time after the high-side switch S2 is turned off (FIG. 19, 752). In the example of FIG. 19, the particular time is preset to be at the minimum value of the auxiliary voltage. At the end of the particular time, the minimum detector 759 samples and holds the minimum value of the sense voltage (FIG. 19, 756). The peak and minimum values of the sense voltage are held at the capacitor C51 for output at a node 754 as the mean of the sense voltage.

Circuits and methods for active clamp flyback converters have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. An active clamp flyback converter comprising:
a low-side switch having a first end that is connected to a first end of a primary winding of a transformer, a second end of the primary winding being connected to a first end of a clamp capacitor;
a high-side switch having a first end connected to the first end of the primary winding and the to the first end of the low-side switch, a second end of the high-side switch being connected to a second end of the clamp capacitor; and
an active clamp flyback (ACF) controller having a first pin that is connected to a third end of the low-side switch to control a switching operation of the low-side switch, a second pin that is connected to a third end of the high-side switch to control a switching operation of the high-side switch, and a third pin that receives an output voltage feedback signal that is indicative of an output voltage of the active clamp flyback converter, the ACF controller being configured to control the switching operation of the high-side switch in accordance with an active clamp switching mode that is selected from at least a first active clamp switching mode and a second active clamp switching mode and to automatically select the active clamp switching mode based on a condition of a load of the active clamp flyback converter, wherein the second active clamp switching mode is a modified active clamp mode and, in the modified active clamp mode, the ACF controller is configured to turn on the high-side switch after the low-side switch turns off in a switching cycle of the active clamp flyback converter, and to turn on the high-side switch in accordance with quasi-resonant switching (QRS) after expiration of a QRS blanking time in the same switching cycle of the active clamp flyback converter.

2. The active clamp flyback converter of claim 1, wherein the first active clamp switching mode is a complementary active clamp mode, and wherein the ACF controller is configured to generate a low-side gate drive signal at the first pin to control the switching operation of the low-side switch, to generate a high-side gate drive signal at the second pin to control the switching operation of the high-side switch, and to decrease a switching frequency of the low-side switch when the load increases during the complementary active clamp mode.

3. The active clamp flyback converter of claim 1, wherein the ACF controller is configured to turn on the low-side switch after a dead time that is adaptively adjusted based on a turn-on time and a turn-off time of the low-side switch.

4. The active clamp flyback converter of claim 1, wherein, in the modified active clamp mode, the ACF controller is configured to generate a low-side gate drive signal at the first pin to control the switching operation of the low-side switch, to generate a high-side gate drive signal at the second pin to control the switching operation of the high-side switch, to generate a first pulse of the high-side gate drive signal in accordance with zero voltage switching (ZVS) to turn on the high-side switch after the low-side switch turns off in the switching cycle of the active clamp flyback converter, and to generate a second pulse of the-high side gate drive signal in accordance with the QRS after expiration of the QRS blanking time to turn on the high-side switch in the same switching cycle of the active clamp flyback converter.

5. The active clamp flyback converter of claim 1, wherein the ACF controller is configured to increase the QRS blanking time as the load decreases.

6. The active clamp flyback converter of claim 1, wherein the ACF controller is configured to turn on the low-side switch after a dead time that follows a delay time, wherein the delay time starts at a peak of a drain-to-source voltage of the low-side switch.

7. The active clamp flyback converter of claim 6, wherein the delay time is adaptively adjusted based on a duty cycle of the low-side switch.

8. The active clamp flyback converter of claim 6, wherein the dead time is adaptively adjusted based on a turn-on time and a turn-off time of the low-side switch.

9. The active clamp flyback converter of claim 1, wherein the ACF controller is configured to detect the output voltage of the active clamp flyback converter from an auxiliary voltage of an auxiliary winding of the transformer.

10. A method of operating an active clamp flyback converter, the method comprising:

generating a low-side gate drive signal to control a switching operation of a low-side switch, a first end of the low-side switch being connected to a first end of a primary winding of a transformer;

generating a high-side gate drive signal to control a switching operation of a high-side switch, a first end of the high-side switch being connected to the first ends of the low-side switch and the primary winding, a second end of the high-side switch being connected to a first end of a clamp capacitor, and a second end of the clamp capacitor being connected to a second end of the primary winding;

detecting a condition of a load of the active clamp flyback converter; and controlling the switching operation of the high-side switch in accordance with a selected active clamp switching mode that is selected from at least two active clamp switching modes of the active clamp flyback converter, the selected active clamp switching mode being selected based on a detected condition of the load, wherein, when the selected active clamp switching mode is a modified active clamp mode, the method further comprises generating a first pulse of the high-side gate drive signal to turn on the high-side switch after the low-side switch turns off in a switching cycle of the active clamp flyback converter, and generating a second pulse of the-high side gate drive signal to turn on the high-side switch in the same switching cycle of the active clamp flyback converter, wherein the first pulse of the high-side gate drive signal is generated in accordance with zero voltage switching (ZVS) and the second pulse of the high-side gate drive signal is generated in accordance with quasi-resonant switching (QRS) after expiration of a QRS blanking time.

11. The method of claim 10, wherein, when the selected active clamp switching mode is the complementary active clamp mode, the method further comprises decreasing a switching frequency of the low-side switch as the load increases.

12. The method of claim 10, wherein, when the selected active clamp switching mode is the modified active clamp mode, the method further comprises:

increasing the QRS blanking time as the load decreases.

13. The method of claim 10, wherein detecting the condition of the load of the active clamp flyback converter comprises:

integrating a drain current of the low-side switch to generate an integrated signal; and determining an output power of the flyback converter based on the integrated signal, an input voltage of the active clamp flyback converter, and a switching frequency of the low-side switch.

14. The method of claim 10, further comprising:

detecting an output voltage of the active clamp flyback converter from an auxiliary voltage of an auxiliary winding of the transformer.

15. An active clamp flyback (ACF) controller for an active clamp flyback converter, the ACF controller comprising:

a first pin that is connected to a gate of a low-side switch;

a second pin that is connected to a gate of a high-side switch;

an oscillator that generates a low-side gate drive signal for controlling a switching operation of the low-side switch, generates a high-side gate drive signal for controlling a switching operation of the high-side switch, decreases a switching frequency of the low-side switch as a load of the active clamp flyback converter increases during a first active clamp switching mode, increases a quasi-resonant switching (QRS) blanking time of the high-side switch as the load decreases during a second active clamp switching mode, and switches between the first and second active clamp switching modes based on a condition of the load, wherein, in the second active clamp switching mode, the oscillator generates a first pulse of the high-side gate drive signal to turn un the high-side switch after the low-side switch turns off in a switching cycle of the active clamp flyback converter, and generates a second pulse of the high-side gate drive signal to turn on the high-side switch in accordance with QRS after expiration of a QRS blanking time in the same switching cycle of the active clamp flyback converter.

16. The ACF controller of claim 15, wherein the oscillator generates the first pulse of the high-side gate drive signal in accordance with zero voltage switching (ZVS).

17. The ACF controller of claim 15, wherein a drain of the low-side switch is connected to a first end of a primary winding of a transformer, a source of the low-side switch is connected to ground, a source of the high-side switch is connected to the drain of the low-side switch, a drain of the high-side switch is connected to a first end of a clamp capacitor, and a second end of the clamp capacitor is connected to a second end of the primary winding.

* * * * *